(12) United States Patent
Lundqvist

(10) Patent No.: US 6,424,844 B1
(45) Date of Patent: Jul. 23, 2002

(54) PORTABLE TELEPHONE

(75) Inventor: Håkan Lundqvist, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/442,459

(22) Filed: Nov. 18, 1999

(30) Foreign Application Priority Data

Nov. 19, 1998 (SE) ................................................ 9803960

(51) Int. Cl.[7] .................................................. H04B 1/38
(52) U.S. Cl. ........................ 455/566; 455/90; 455/572; 379/433.04; 345/173
(58) Field of Search ........................... 455/575, 90, 566, 455/128, 351, 572, 550, 127; 379/428.01, 428.03, 433.04; 345/169, 173, 174

(56) References Cited

U.S. PATENT DOCUMENTS

| | | | |
|---|---|---|---|
| 4,825,209 A | 4/1989 | Sesaki et al. | |
| 5,553,296 A | 9/1996 | Forrest et al. | |
| 5,557,221 A | 9/1996 | Taguchi et al. | |
| 5,717,321 A | 2/1998 | Kerth et al. | |
| 5,742,894 A | 4/1998 | Jambhekar et al. | |
| 5,892,403 A | 4/1999 | Brandt | |

FOREIGN PATENT DOCUMENTS

| | | |
|---|---|---|
| EP | 626633 | 11/1994 |
| EP | 676781 | 10/1995 |
| EP | 787993 | 8/1997 |
| EP | 813328 | 12/1997 |
| EP | 905605 | 3/1999 |
| GB | 2297661 | 8/1996 |
| JP | 8-212006 | 2/1995 |

*Primary Examiner*—Doris H. To
(74) *Attorney, Agent, or Firm*—Burns, Doane, Swecker & Mathis, L.L.P.

(57) ABSTRACT

The present invention relates to a portable telephone, which can be switched on/off by using the touch screen (20) of the portable telephone (10)

12 Claims, 2 Drawing Sheets

PORTABLE TELEPHONE

BACKGROUND

The present invention relates to controlling the supply of power to a portable communication device of the type mentioned in the preamble of the independent claims.

Many portable communication devices, such as mobile telephones, personal communicators etc, normally require a "hardware power on system" for powering on. A "hardware power on system" is referred to as a system, which comprises a physical switch, controlling the power on of the portable communication device.

Other portable communication devices have a hinged front panel, a so-called a flip, which can be opened when the device is used for certain functions and which can be closed in order to reduce the bulk of the device when these functions are not required.

One example of such a device is the mobile telephone known from the patent GB-A-2 297 661 which has a flip which can be folded down to expose a touch screen display. When the flip is folded up against the touch screen display the screen can be operated by means of a keypad consisting of a plurality of buttons which extend through the flip and which can be pressed by a user into contact with the touch sensitive parts of the touch screen display. There is a flip position-indicating switch in the main body of the unit which can be operated by a switch activation device disposed in the flip. The flip position indicating switch and switch activation device co-operate to produce a mode change signal which is sent to the processor of the mobile phone and which indicates if the flip is open or closed. If the flip is closed a first set of functions is available to the user and if the flip is open a second set of functions is available to the user. Cellular telephones of this type can be switched on and off by a hardware switch which disconnects tie processor from the logic voltage supply in order to minimise unnecessary battery drainage caused by the logic voltage supply leakage current.

Thus a separate hardware switch is required which increases the manufacturing costs and, as it introduces a potential failure path, and also lowers the reliability of the mobile telephone.

It is also known to use "soft power control" for instance in personal computer systems, to be able to save power and extend battery lifetime. This is ordinarily done by the operator of the computer system powering on not using a "hard power on switch". "Soft power control" in such a computer system normally comprise several power control modes, such as a "full power mode" and a sleep mode. In the "full power mode", the main parts of the computer system are supplied with power and are active. In the "sleep mode", one or more parts of the computer system are not supplied with power and are said to be inactive. In the "sleep mode", the operator depresses a key on the keyboard to power on the main parts of the computer system.

It is known from U.S. Pat. No. 5,553,296 to use a touch screen for a power control function in a computer system, whereby the touch screen is employed to control a number of power modes, such as "full power mode" and "sleep mode" in the computer system. The touch screen detects a touch input by the operator from the touch screen. If the computer system is in a power down mode, a so-called "sleep mode", the touch screen provides a main power on signal after the touch is detected.

U.S. Pat. No. 4,825,209 describes a remote control apparatus, which puts a transmitting portion, a receiving portion and an image display control portion thereof in an enabled state for a predetermined period of time after a touch panel is pressed to reduce power consumption. The press detection is done with push button switches in the corners of a remote control.

JP-A-8-212 006 describes switching on a flat panel indicator if any touch input is sensed. When there is no touch input for a predetermined time period, the flat panel is switched off.

One problem is that prior art portable communication devices, such as a mobile phone comprising a touch screen display, such as a touch screen LCD (Liquid Crystal Display), require additional mechanical on-off switches positioned at different locations, whereby the way to power up differs from device to device, even for similar devices of the same family.

Another problem is that these switches require space to be implemented in the portable communication devices.

Yet another problem is that today's portable communication devices, in particular portable telephones comprising a flip hang, must be provided with wires through the flip hinge if a hardware power on-off switch is provided thereon.

SUMMARY

The object of the invention is to solve the described problems and provide an improved portable telephone, in which the use of a separate hardware switch to switch on the device is unnecessary. Herein, portable telephones means: mobile telephones, cordless telephones and personal communicators.

Another object of the present invention is to improve the reliability of such a portable telephone and to reduce their manufacturing costs.

This is attained according to the present invention by means of a portable telephone in which the touch screen display is used for switching on the device, wherein a hardware switch is unnecessary. The touch screen display comprises at least one inner and one outer essentially transparent conducting plate which are movable in relation to each other between a first position, in which the plates are spaced apart and a second position, in which the plates are contacted to each other by the outer plate being depressed by a user of the portable telephone by means of an input means, such as a key pad or direct activation providing a pressure against the touch screen display, wherein a voltage controlled switch connected to said plates is adapted to turn on the power of the portable telephone upon receipt of a signal indicating that a power-on key has been depressed by the user.

An advantage of the present invention is that the invention simplifies the use of a portable telephone, compared to known technique.

Another advantage of the present invention is that no additional switch must be incorporated in the portable telephone. It is possible to use the image display of a portable telephone, independent on model for powering on.

The invention will now be described in more detail with reference to preferred embodiments and to the appended drawings.

DETAILED DESCRIPTION

Figure 1:
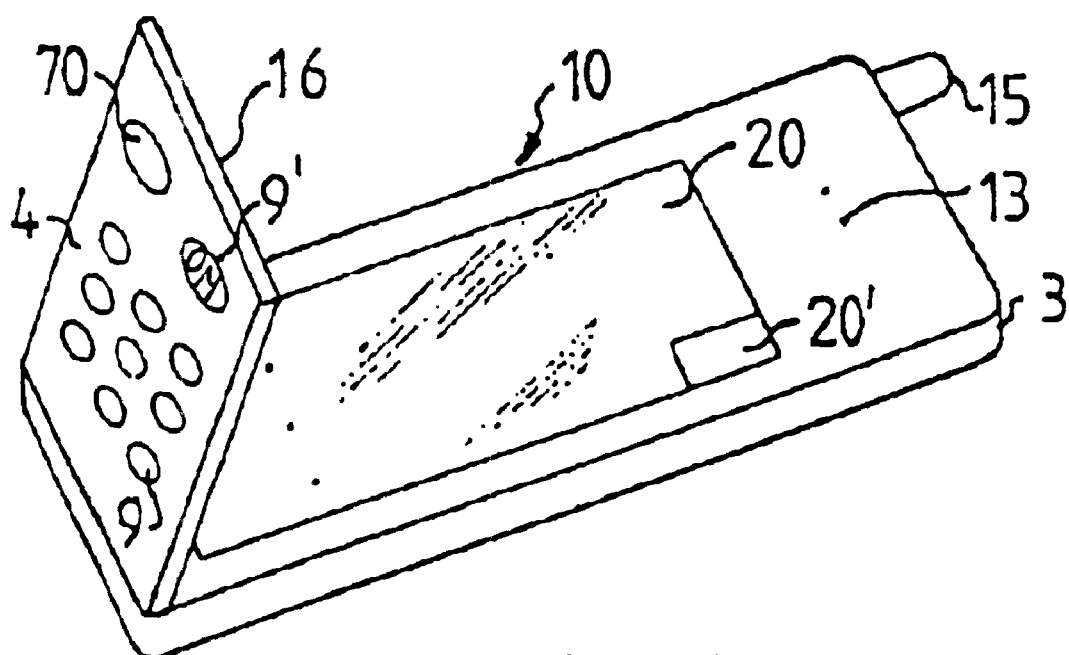
FIG. 1 shows a perspective view of a portable telephone, according to the invention, comprising a touch screen display for controlling the supply of power to the portable telephone.

FIG. 1 shows a perspective view of a portable telephone 10, provided with a touch screen display 20 for displaying information such as telephone number, signal strength, battery level, roaming information etc, and intended for receiving commands from the user, in a conventional way as well as the power-on function. The portable telephone 10 has a main body 3, comprising a loudspeaker 13, an antenna 15, a microphone 16, and a flip 4 movable in relation to the main body, which can be folded up against the main body 3. The flip 4 has input means 70 for example a keypad with a plurality of keys 9, which each correspond to a desired function. The function of each key 9 is determined by the software of the portable telephone 10. The touch screen display 20 detects which key 9 has been pushed and carries out the desired function. Activating the power-on key 9' causes the touch screen display 20 to register that the key 9' has been pushed and causes a voltage controlled switch 2' (see FIG. 2) to connect the power supply 50 (not shown).

Figure 2:
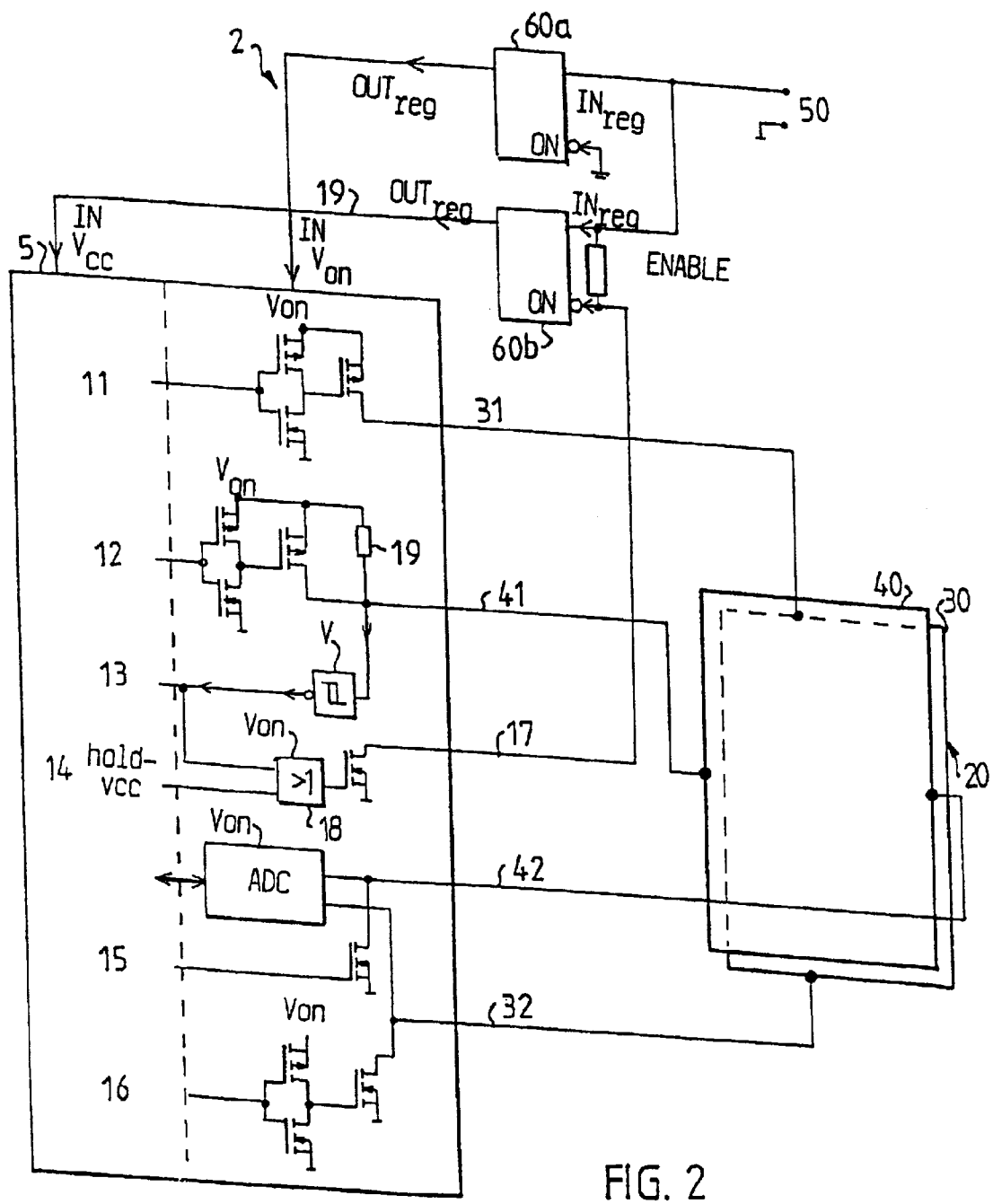
FIG. 2 shows a schematically block diagram of the touch screen display and the voltage controlled switch in a portable telephone according to the invention.

FIG. 2 is a schematically block diagram of an embodiment of the touch screen display 20 connected to the voltage controlled switch 2 for connecting and disconnecting the power supply 50 such as a battery to the portable telephone 10. The power supply 50 is connected to the input terminal $IN_{reg}$ of a first voltage regulator 60a, which can provide a fixed logic voltage supply Von on an output terminal $OUT_{reg}$. The voltage regulator 60a is always enabled to provide the high input voltage Von to the control means 5 on its input terminal $IN_{Von}$. The power supply 50 is also connected to the input terminal $IN_{reg}$ of a second voltage regulator 60b, which can provide a logic voltage supply Vcc on its output terminal $OUT_{reg}$. The voltage regulator 60b is enabled to provide the logic voltage supply Vcc to the control means 5 on its input terminal $IN_{Vcc}$, when it receives a high input voltage on its ENABLE terminal. This causes the control means 5 to start its logic, which controls the power-on function. The logic is of conventional type for controlling a touch screen display also of conventional type and the function thereof will not be described in more detail The logic comprises at least a main microprocessor, as well as other control circuits of known technologies.

The way of applying a high input voltage to the ENABLE terminal of regulator 60b, which thereby allows the power supply to be connected to the input terminal $IN_{Vcc}$ of the control means 5, to power-on the device will now be described in more detail.

The touch screen display 20 comprises at least two plates, one inner plate 30 and one outer plate 40 spaced apart, which are connected via four signal lines 31, 32, 41, 42 to the terminals of the control means 5 in a conventional way. The outer plate 40, intended to be depressed by a user, is preferably connected via signal line 41 provided with a pull-up resistor 19 and the inner plate 30 is connected to ground when the mobile is powered down. When the portable telephone is powered. down, Vcc is 0V (low) and Von, for instance 5 V (high), All signals on the output terminals 11–16 and 18 of the control means 5 are then low. Thus, in this mode one of the plates 40 has high potential and the other plate 30 has low potential.

Now referring to FIG. 1, when the user depresses a power-on key on the input means 70 provided on the touch screen display 20, the plate 40 that is connected via the pull up resistor 19 will be forced to ground, whereby the signal in signal line 41 will go low. A signal will be sent via signal line 17 to the ENABLE terminal of regulator 60b, which will provide an enabling current, or in other words, a high potential, to the terminal $IN_{Vcc}$ of the control means 5, thereby starting its logic to obtain a power-on function. The control means 5 will after it has set "hold_Vcc" on its terminal 14, start to interpret the meaning of the activation, starting with detecting the touch position in a conventional way.

One or more keys 9 of the keypad 70 can be assigned a power-on function by the software of the control means 5.

If it were not on the "on button position", "hold_Vcc" on signal line 14 is released again and the portable telephone will power down again, provided that the pressure on touch screen display 20 is released, otherwise the portable telephone will stay on.

In this way switching on of the portable telephone is obtained without requiring any special on hardware switch.

For one embodiment the touch screen display comprises a resistive type of touch screen display, but is not limited thereto. The resistive touch screen display comprises two sheets of clear material, which is conducting.

The time period between performing the power-on function will vary depending on application. Thus, the touch screen display must be depressed for a predetermined period of time before performing. the power on command This prevents accidental power on from an inadvertent touching of the screen.

In alternative embodiments, a plurality of power on modes may exist between the fill power up and the full power down mode.

Shutting down the portable telephone is performed in a conventional way. One of the keys in the input means 70 can be assigned an "off" function by the software of the control means.

The input means is for instance a movable housing element, such as a flip, comprising a push-through keyboard. It is also possible to use direct activation providing a pressure against the touch screen display 20, whereby the touch screen display can comprise a user data area (20') divided into multiple sub-areas corresponding to the keys of the keypad.

While the invention has been illustrated by a portable telephone with a flip, it is also possible to use other arrangements of keypads, for instance of sliding type.

The voltage regulator 60a which is always enabled to provide a high input voltage to the control means 5 can be substituted by any other connection means, provided that the components in the control means 5 are not destroyed.

The voltage regulator 60b can be substituted by any other voltage-controlled switch.

A "pull down" solution is also possible.

While the advantages of the invention are most fully realised when no separate hardware switch is used to switch the processor on and off, it is also possible to provide the portable telephone with a separate hardware switch if so desired in order to control the power supply to some other component of the portable telephone, as well as the processor.

What is claimed is:

1. A method for controlling connection of a power supply in a portable telephone having a touch screen display for powering-on the telephone, said touch screen controlled by a touch screen controller and being divided into at least a power-on section and a second section, and user-operable input means which can order a voltage controlled switch connected to said touch screen display to turn on the power of the portable telephone, the method comprising the steps of:

sensing if the touch screen display has been depressed by a user of the portable telephone, and if It has been depressed, enabling a voltage controlled switch by a signal originating from the touch screen display in order to turn on the power of the portable telephone, including powering up the touch screen controller that is otherwise powered down; and detecting at least one touch position on the touch screen in which the outer plate is pressed against the inner plate, and if the touch position corresponds to the power-on area of the touch screen, maintaining the power to the telephone, and if not, turning the telephone off.

2. A portable telephone comprising:

an input means;

at least one power supply;

at least one touch screen display, said touch screen controlled by a touch screen controller and being divided into at least a power-on section and a second section and having at least one inner conducting plate and at least one outer conducting plate that are substantially transparent and movable in relation to one another between a first position in which the plates are spaced apart and a second position in which the plates are contacted to one another by the outer plate being pressed against the inner plate using the input means;

a voltage controlled switch coupled to the conducting plates and adapted to turn on the power of the portable telephone, including powering up the touch screen controller that is otherwise powered down, upon receipt of a signal indicating the outer plate being pressed against the inner plate from the input means; and the touch screen controller adapted to detect at least one touch position on the touch screen in which the outer plate is pressed against the inner plate and keep the power on only if the touch position corresponds to a power-on area of the touch screen.

3. The portable telephone of claim 2, wherein the input means is at least one of a keypad having a plurality of keys and a direct activation means of providing pressure against the touch screen display.

4. The portable telephone according to claim 3, wherein the keypad is provided on a movable housing element coupled to the portable telephone, such as a flip.

5. The portable telephone according to claim 3, wherein the touch screen display further comprises a user data area divided into multiple sub-areas corresponding to the keys of the keypad.

6. The portable telephone of claim 2, wherein the power supply is a battery.

7. The portable telephone according to claim 2, wherein the voltage controlled switch comprise a control means adapted to enable a voltage controlled regulator to connect said power supply to said portable telephone.

8. The portable telephone according to claim 2, wherein when said plates are in said second position, both plates will obtain a same potential for transferring signals to the voltage controlled switch adapted to connect the power supply to the portable telephone.

9. The portable telephone according to claim 8, wherein said potential is low by means of both plates being connected to a ground potential.

10. The portable telephone according to claim 2, wherein when the plates are in the first position, an outer plate potential is high and an inner plate potential is low for transferring signals to the voltage controlled switch adapted to disconnect the power supply from the portable telephone.

11. The portable telephone according to claim 10, wherein said inner plate low potential is obtained by connecting the inner plate to a ground potential, and the outer plate high potential is obtained by using a pull up resistor connecting the outer plate to a voltage source.

12. The portable telephone according to claim 2, wherein the portable telephone is a mobile telephone.

* * * * *